US011556551B2

United States Patent
Akyamac et al.

(10) Patent No.: US 11,556,551 B2
(45) Date of Patent: Jan. 17, 2023

(54) INSIGHT GENERATION FROM A TABULAR DATASET

(71) Applicant: Nokia Solutions and Networks Oy, Espoo (FI)

(72) Inventors: Ahmet Akyamac, Bridgewater, NJ (US); Huseyin Uzunalioglu, Winchester, MA (US)

(73) Assignee: Nokia Solutions and Networks Oy, Espoo (FI)

( * ) Notice: Subject to any disclaimer, the term of this patent is extended or adjusted under 35 U.S.C. 154(b) by 163 days.

(21) Appl. No.: 17/103,467

(22) Filed: Nov. 24, 2020

(65) Prior Publication Data

US 2022/0164347 A1 May 26, 2022

(51) Int. Cl.
*G06F 17/00* (2019.01)
*G06F 16/2458* (2019.01)
*G06N 20/00* (2019.01)

(52) U.S. Cl.
CPC ......... *G06F 16/2465* (2019.01); *G06N 20/00* (2019.01)

(58) Field of Classification Search
CPC ..... G06F 16/2465; G06N 20/00; G06N 5/025
See application file for complete search history.

(56) References Cited

U.S. PATENT DOCUMENTS

| 6,301,575 B1 * | 10/2001 | Chadha | G06F 16/2465 |
| 6,988,108 B2 * | 1/2006 | Bernhardt | G06F 16/2465 |
| | | | 707/999.102 |
| 2018/0107695 A1 * | 4/2018 | Yang | G06F 16/2282 |

OTHER PUBLICATIONS

Jeanie R. Delos Arcos et al., Analyzing Online Transaction Data using Association Rule Mining: Misumi Philippines Market Basket Analysis. In Proceedings of the 2019 7th International Conference on Information Technology: IoT and Smart City, Association for Computing Machinery, 45-49, Dec. (Year: 2019).*

(Continued)

*Primary Examiner* — Greta L Robinson
(74) *Attorney, Agent, or Firm* — Duft & Bornsen, PC

(57) ABSTRACT

Systems, methods, and software of processing a tabular dataset. In one embodiment, a system extracts raw association rules from the tabular dataset. Each of the raw association rules comprises a relationship between a set of antecedents and a single consequent, and corresponds to one or more transactions. The system determines potential rule merge groups of the raw association rules based on the antecedents, and determines one or more actual rule merge groups of the raw association rules in each potential rule merge group based on the transactions. The system combines the raw association rules in an actual rule merge group to generate a merged association rule. The system then generates a set of insights based on one or more merged association rules, and performs an operation based on the set of insights.

20 Claims, 12 Drawing Sheets

(56) References Cited

OTHER PUBLICATIONS

Jiawei Han et al; Data Mining Concepts and Techniques; The Morgan Kaufmann Series in Data Management Systems; Simon Fraser University; 2012 by Elsevier Inc.

Market Basket Analysis; SmartBridge report; Market Basket Analysis 101; Anticipating Customer Behavior; https://smartbridge.com/market-basket-analysis-101.

Mohammed J. Zaki; Scalable Algorithms for Association Mining; IEEE Transaction on Knowledge and Data Engineering; vol. 12, No. 3, May/Jun. 2000.

Rakesh Agrawal et al; Fast Algorithms for Mining Association Rules; IBM Almaden Research Center; 1994.

Rakesh Agrawal et al; Mining Association Rules between Sets of items in Large Databases; IBM Almaden Research Center.

* cited by examiner

| | ATT NAME | ATT NAME | ATT NAME | ATT NAME | ATT NAME | ATT NAME | ATT NAME | ATT NAME |
|---|---|---|---|---|---|---|---|---|
| $t_1$ | | | | | | | | |
| $t_2$ | | | | | | | | |
| $t_3$ | | | | | | | | |
| $t_4$ | | | | | | | | |
| $t_5$ | | | | | | | | |
| $t_6$ | | | | | | | | |
| $t_7$ | | | | | | | | |
| $t_8$ | | | | | | | | |
| ... | | | | | | | | |
| $t_n$ | | | | | | | | |

START
↓
RECEIVE USER INPUT — 502
↓
PERFORM ASSOCIATION RULES MINING TO EXTRACT RAW ASSOCIATION RULES — 504
↓
FILTER THE RAW ASSOCIATION RULES — 506
↓
OUTPUT THE RAW ASSOCIATION RULES — 508

INSIGHT GENERATION FROM A TABULAR DATASET

TECHNICAL FIELD

This disclosure is related to the field of data science, and more particularly, to processing tabular datasets.

BACKGROUND

Today, diverse sets of data are collected from a variety of sources. Data mining uses scientific methods, processes, algorithms, and systems to extract information from a dataset (structured or unstructured), and transform the information into a comprehensible structure for further use. Transformation of raw data into comprehensible information may require substantial amounts of manual effort from data scientists. And, algorithms used in processing the raw data typically generate a large volume of statistical output, which is difficult to consume in a meaningful way. Thus, it may be desirable to identify improved ways of processing datasets.

SUMMARY

Described herein is a system and associated method of extracting meaningful insights from a tabular dataset. A system as described herein extracts a set of raw association rules from the tabular dataset, such as with an association rules mining algorithm. The system then attempts to combine or merge groups of the raw association rules to generate a set of insights that is smaller in scale than the set of raw association rules. Thus, the set of insights may be processed or interpreted in a more efficient manner.

One embodiment comprises a data mining system that includes at least one processor and memory. The processor causes the data mining system to receive a tabular dataset comprised of rows representing transactions, and columns representing attributes collected for the transactions, and to extract raw association rules from the tabular dataset. Each of the raw association rules comprises a relationship between a set of antecedents and a single consequent, and corresponds to one or more transactions. The processor causes the data mining system to determine potential rule merge groups of the raw association rules based on the antecedents of the raw association rules. For a potential rule merge group of the potential rule merge groups, the processor causes the data mining system to determine one or more actual rule merge groups of the raw association rules in the potential rule merge group based on the transactions corresponding to the raw association rules in the potential rule merge group. For an actual rule merge group of the actual rule merge groups, the processor causes the data mining system to combine the raw association rules in the actual rule merge group to generate a merged association rule. The processor causes the data mining system to generate a set of insights based on one or more merged association rules, and perform an operation based on the set of insights.

In one embodiment, the processor causes the data mining system to display the set of insights to a user through a user interface component.

In one embodiment, the processor causes the data mining system to train a machine-learning model of a machine-learning system with the set of insights.

In one embodiment, the processor causes the data mining system to automatically transmit a control signal to a management system instructing the management system to perform a corrective action or preventative action based on the set of insights.

In one embodiment, the processor causes the data mining system to receive user input from a user designating a set of the columns in the tabular dataset as the antecedents, and a set of the columns in the tabular dataset as the consequents.

In one embodiment, the processor causes the data mining system to calculate a first distance matrix between the raw association rules based on the antecedents of the raw association rules, and perform hierarchical clustering to identify the potential rule merge groups based on the first distance matrix.

In one embodiment, the processor causes the data mining system to determine whether a potential rule merge group is a singleton, calculate, when the potential rule merge group is not a singleton, a second distance matrix between the raw association rules in the potential rule merge group based on the transactions of the raw association rules in the potential rule merge group, and perform hierarchical clustering to identify the actual rule merge groups based on the second distance matrix.

In one embodiment, the processor causes the data mining system to form the antecedents of a merged association rule by taking the union of the antecedents of the raw association rules in the actual rule merge group, form the consequents of the merged association rule by taking the union of the consequents of the raw association rules in the actual rule merge group, and calculate the transactions corresponding to the merged association rule by taking the intersection of the transactions of the raw association rules in the actual rule merge group.

In one embodiment, the set of insights comprises a set of initial insights that includes the merged association rules. The processor causes the data mining system to determine potential insight merge groups of the initial insights based on the consequents of the initial insights. For a potential insight merge group of the potential insight merge groups, the processor causes the data mining system to determine one or more actual insight merge groups of the initial insights in the potential insight merge group based on the transactions corresponding to the initial insights in the potential insight merge group. For an actual insight merge group of the actual insight merge groups, the processor causes the data mining system to combine the initial insights in the actual insight merge group to generate a merged insight. The processor causes the data mining system to generate a set of final insights based on one or more merged insights. The processor causes the data mining system to perform the operation based on the set of final insights.

In one embodiment, the processor causes the data mining system to calculate a first distance matrix between the initial insights based on the consequents of the initial insights, and perform hierarchical clustering to identify the potential insight merge groups based on the first distance matrix.

In one embodiment, the processor causes the data mining system to determine whether the potential insight merge group is a singleton, calculate, when the potential insight merge group is not a singleton, a second distance matrix between the initial insights in the potential insight merge group based on the transactions of the initial insights in the potential insight merge group, and perform hierarchical clustering to identify the actual insight merge groups based on the second distance matrix.

Another embodiment comprises a method of processing a tabular dataset. The method comprises receiving the tabular dataset comprised of rows representing transactions, and columns representing attributes collected for the transactions, and extracting raw association rules from the tabular dataset. Each of the raw association rules comprises a relationship between a set of antecedents and a single consequent, and corresponds to one or more transactions. The method further comprises determining potential rule merge groups of the raw association rules based on the antecedents of the raw association rules. The method further comprises determining, for a potential rule merge group of the potential rule merge groups, one or more actual rule merge groups of the raw association rules in the potential rule merge group based on the transactions corresponding to the raw association rules in the potential rule merge group. The method further comprises combining, for an actual rule merge group of the actual rule merge groups, the raw association rules in the actual rule merge group to generate a merged association rule. The method further comprises generating a set of insights that includes one or more merged association rules, and performing an operation based on the set of insights.

In one embodiment, extracting the raw association rules from the tabular dataset comprises receiving user input from a user designating a set of the columns in the tabular dataset as the antecedents, and a set of the columns in the tabular dataset as the consequents.

In one embodiment, determining the potential rule merge groups comprises calculating a first distance matrix between the raw association rules based on the antecedents of the raw association rules, and performing hierarchical clustering to identify the potential rule merge groups based on the first distance matrix.

In one embodiment, determining, for the potential rule merge group of the potential rule merge groups, one or more actual rule merge groups comprises determining whether the potential rule merge group is a singleton, calculating, when the potential rule merge group is not a singleton, a second distance matrix between the raw association rules in the potential rule merge group based on the transactions of the raw association rules in the potential rule merge group, and performing hierarchical clustering to identify the actual rule merge groups based on the second distance matrix.

In one embodiment, combining the raw association rules in the actual rule merge group to generate a merged association rule comprises forming the antecedents of the merged association rule by taking the union of the antecedents of the raw association rules in the actual rule merge group, forming the consequents of the merged association rule by taking the union of the consequents of the raw association rules in the actual rule merge group, and calculating the transactions corresponding to the merged association rule by taking the intersection of the transactions of the raw association rules in the actual rule merge group.

In one embodiment, the set of insights comprises a set of initial insights that includes the merged association rules. The method further comprises determining potential insight merge groups of the initial insights based on the consequents of the initial insights. The method further comprises determining, for a potential insight merge group of the potential insight merge groups, one or more actual insight merge groups of the initial insights in the potential insight merge group based on the transactions corresponding to the initial insights in the potential insight merge group. The method further comprises combining, for an actual insight merge group of the actual insight merge groups, the initial insights in the actual insight merge group to generate a merged insight. The method further comprises generating a set of final insights based on one or more merged insights. Performing the operation based on the set of insights comprises performing the operation based on the set of final insights.

In one embodiment, determining the potential insight merge groups comprises calculating a first distance matrix between the initial insights based on the consequents of the initial insights, and performing hierarchical clustering to identify the potential insight merge groups based on the first distance matrix.

In one embodiment, determining, for the potential insight merge group of the potential insight merge groups, one or more actual insight merge groups comprises determining whether the potential insight merge group is a singleton, calculating, when the potential insight merge group is not a singleton, a second distance matrix between the initial insights in the potential insight merge group based on the transactions of the initial insights in the potential insight merge group, and performing hierarchical clustering to identify the actual insight merge groups based on the second distance matrix.

Another embodiment comprises a non-transitory computer readable medium embodying programmed instructions executed by a processor, wherein the instructions direct the processor to implement a method of processing a tabular dataset. The method comprises receiving the tabular dataset comprised of rows representing transactions, and columns representing attributes collected for the transactions, and extracting raw association rules from the tabular dataset. Each of the raw association rules comprises a relationship between a set of antecedents and a single consequent, and corresponds to one or more transactions. The method further comprises determining potential rule merge groups of the raw association rules based on the antecedents of the raw association rules. The method further comprises determining, for a potential rule merge group of the potential rule merge groups, one or more actual rule merge groups of the raw association rules in the potential rule merge group based on the transactions corresponding to the raw association rules in the potential rule merge group. The method further comprises combining, for an actual rule merge group of the actual rule merge groups, the raw association rules in the actual rule merge group to generate a merged association rule. The method further comprises generating a set of insights that includes one or more merged association rules, and performing an operation based on the set of insights.

Another embodiment comprises a data mining system that includes a means for receiving a tabular dataset comprised of rows representing transactions, and columns representing attributes collected for the transactions, and for extracting raw association rules from the tabular dataset. Each of the raw association rules comprises a relationship between a set of antecedents and a single consequent, and corresponds to one or more transactions. The data mining system further includes a means for determining potential rule merge groups of the raw association rules based on the antecedents of the raw association rules. The data mining system further includes a means for determining, for a potential rule merge group of the potential rule merge groups, one or more actual rule merge groups of the raw association rules in the potential rule merge group based on the transactions corresponding to the raw association rules in the potential rule merge group. The data mining system further includes a means for combining, for an actual rule merge group of the actual rule merge groups, the raw association rules in the actual rule merge group to generate a merged association rule. The data mining system further includes a means for generating a set of insights based on one or more merged association rules, and for performing an operation based on the set of insights.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

In the embodiments described below, it is assumed that an entity, such as a company, health care organization, educational organization, government organization, etc., generates and/or collects a large volume of data. The entity may store and manage the data on in-house servers, the cloud, or another type of data warehouse. The data is sorted, organized, and formatted into a data table for further processing.

One example of an entity that collects a large volume of data is a wireless service provider. A wireless service provider may collect performance, quality, and/or experiential data in large data tables. Some examples include customer care for triple play services, customer experience management for wireless networks, and flow records for networking applications. There may be a desire to extract insights from these data tables that will enable actions to improve the customer experience, maintain high service levels, and address endemic problems. Some of these insights may include, for example, the main factors behind low customer experience, the circumstances leading to poor call quality, problems associated with network outages, etc. The following description uses examples of data collected by a wireless service provider or the like for the purpose of illustration, but the concepts described below may apply to other applications that generate data tables.

Figure 1:
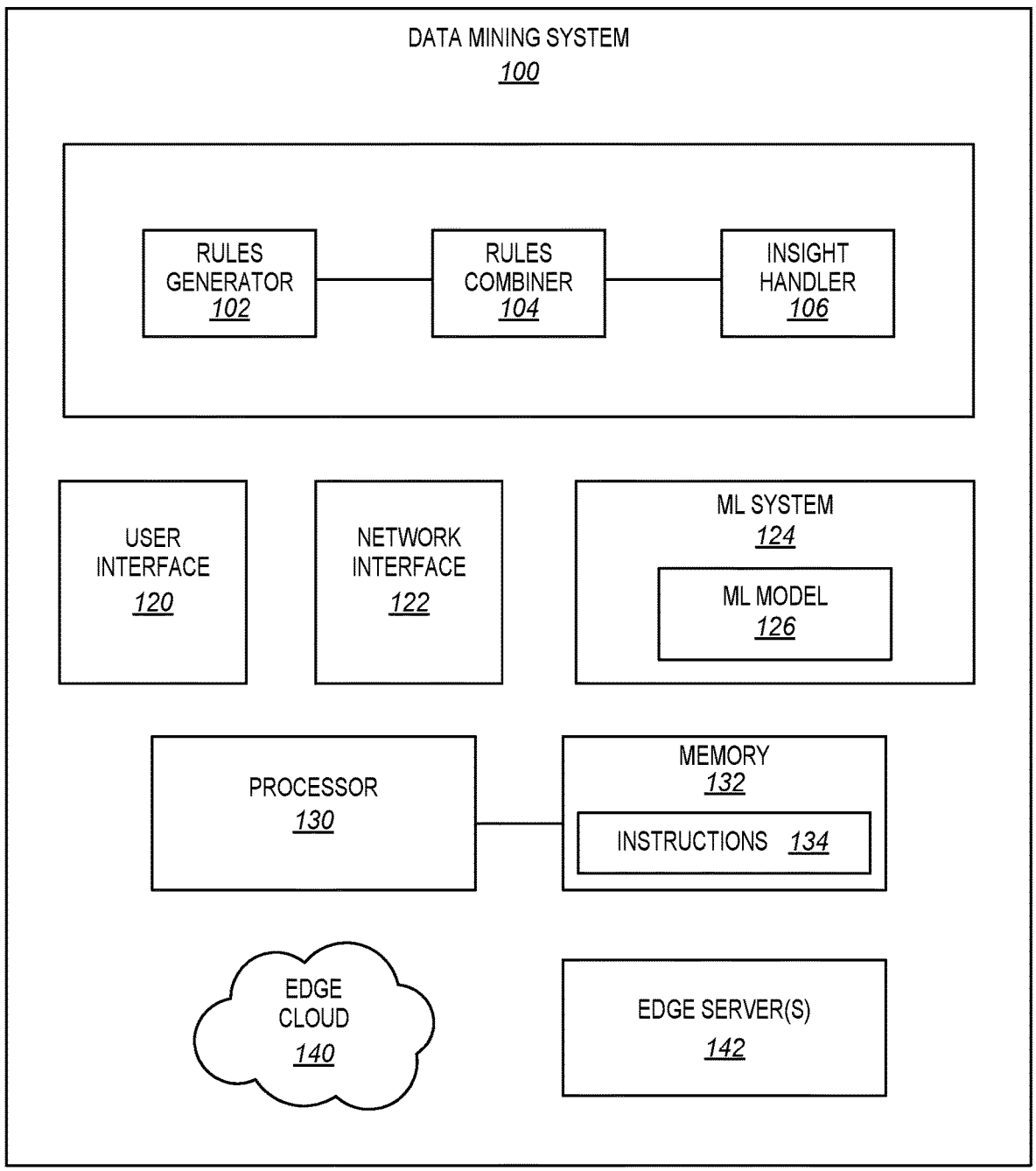
FIG. 1 is a block diagram of a data mining system in an illustrative embodiment.
Figure 2:
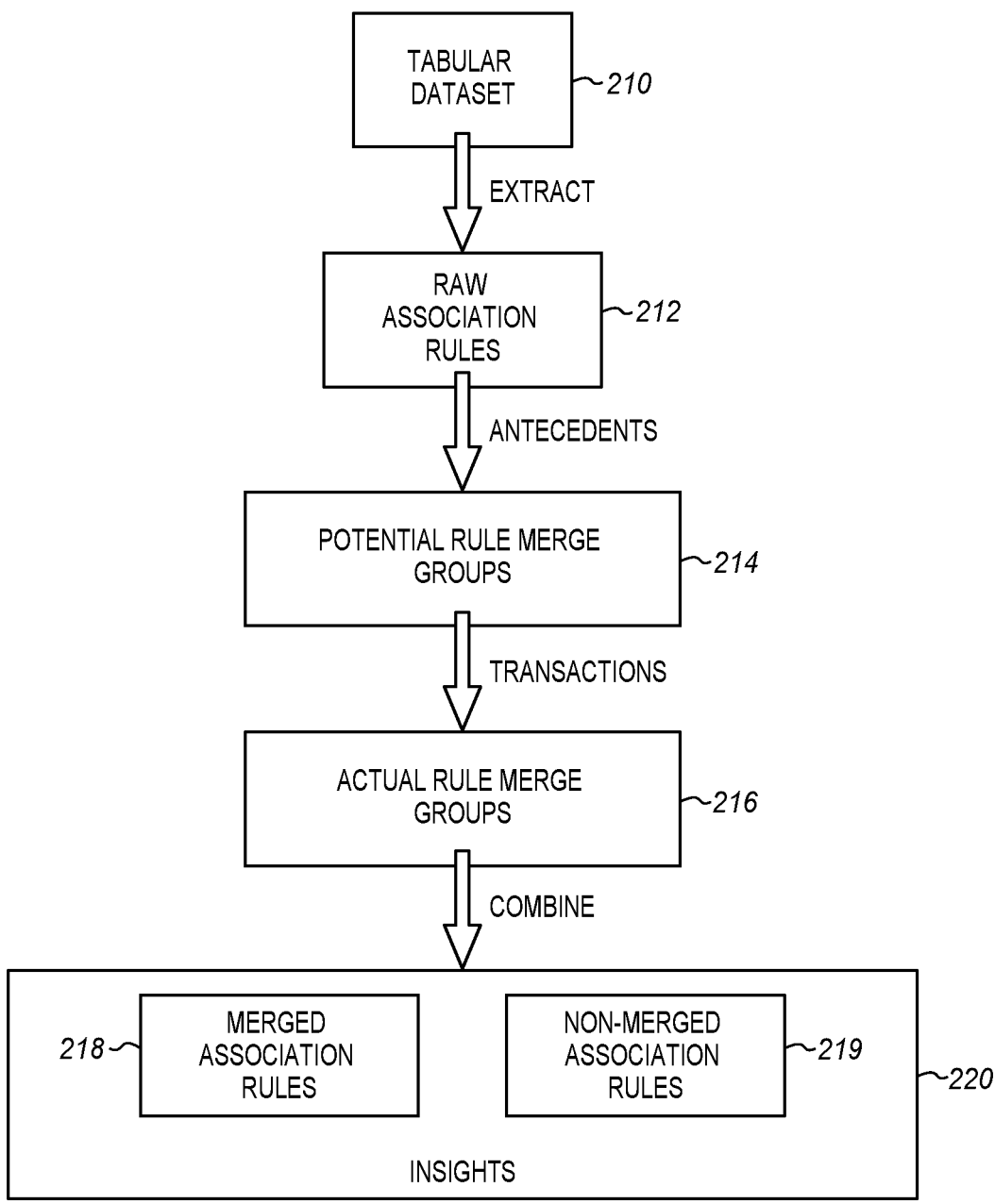
FIG. 2 is a block diagram showing an overview of an end-to-end mining process in an illustrative embodiment.

FIG. 1 is a block diagram of a data mining system 100 in an illustrative embodiment. At a high level, data mining system 100 provides an end-to-end mining process that starts with a tabular dataset, and produces a set of insights. FIG. 2 is a block diagram showing an overview of the end-to-end mining process in an illustrative embodiment. A tabular dataset 210 is comprised of rows that represent distinct transactions, and columns populated with data for the transactions. Data mining system 100 extracts a set of raw association rules 212 from the tabular dataset 210. A raw association rule 212 indicates a relation between one or more "antecedents" (also referred to as a "predictor" or "observation"), and single "consequent" (also referred to as an "outcome", "consequence", or "effect"). Antecedents and consequents are mined from the tabular data, and a consequent is an item that is found in combination with one or more antecedents. The set of raw association rules 212 may be quite large, so data mining system 100 attempts to combine or merge at least some of the raw association rules 212 based on similarities between the raw association rules 212. To do so, data mining system 100 identifies groups of raw association rules 212 (i.e., potential rule merge groups 214) that are potentially combinable based on similarities in the antecedents of the raw association rules 212. From the potential rule merge groups 214, data mining system 100 identifies which of the raw association rules 212 are actually combinable based on the transactions associated with the raw association rules 212 (i.e., actual rule merge groups 216). Data mining system 100 then combines raw association rules 212 in the actual rule merge groups 216 to form merged association rules 218. The merged association rules 218 represent at least part of the set of insights 220 gleaned from the tabular dataset 210. As will be described in more detail below, some of the raw association rules 212 that cannot be merged may also represent part of the set of insights 220 (i.e., non-merged association rules 219). The set of insights 220 is smaller in scale than the set of raw association rules 212, and can be handled more efficiently. For example, although the tabular dataset 210 may be voluminous, the set of insights 220 provided by data mining system 100 may be on a human-consumable scale. This may allow a user to select insights 220 on which to take corrective or preventive actions.

In FIG. 1, data mining system 100 includes the following sub-systems: a rules generator 102, a rules combiner 104, and an insight handler 106. Rules generator 102 comprises circuitry, logic, hardware, means, etc., configured to receive a tabular dataset 210, and extract raw association rules 212 from the tabular dataset 210. Rules combiner 104 comprises circuitry, logic, hardware, means, etc., configured to merge or combine two or more raw association rules 212 to generate a merged association rule 218, and generate a set of insights 220 based on the merged association rules 218. Insight handler 106 comprises circuitry, logic, hardware, means, etc., configured to perform one or more operations or actions based on the set of insights 220.

In another embodiment, data mining system 100 may further include a user interface component 120. User interface component 120 is a hardware component for interacting with an end user. For example, user interface component 120 may include a screen (e.g., touch screen, Liquid Crystal Display (LCD), Light Emitting Diode (LED) display, viewfinder, etc.) or the like. User interface component 120 may include a keyboard or keypad, a tracking device (e.g., a trackball or trackpad), a speaker, a microphone, etc.

Data mining system 100 may further include a network interface component 122. Network interface component 122 is a hardware component that exchanges messages, signaling, or packets with other elements, such as an element of a mobile or wireless network.

Data mining system 100 may further include a Machine-Learning (ML) system 124. ML system 124 comprises circuitry, logic, hardware, means, etc., configured to use machine learning techniques to perform functions, such as to make predictions, recommendations, or classifications. ML system 124 operates based on one or more ML models 126 that are trained for ML system 124.

Data mining system 100 may include various other components or sub-systems not specifically illustrated in FIG. 1.

One or more of the subsystems of data mining system 100 may be implemented on a hardware platform comprised of analog and/or digital circuitry. One or more of the subsystems of data mining system 100 may be implemented on a processor 130 that executes instructions 134 stored in memory 132. Processor 130 comprises an integrated hardware circuit configured to execute instructions 134, and memory 132 is a non-transitory computer readable storage medium for data, instructions 134, applications, etc., and is accessible by processor 130. In other alternatives, one or more of the subsystems of data mining system 100 may be implemented on an edge cloud 140, one or more edge servers 142, or another architecture.

Figure 3:
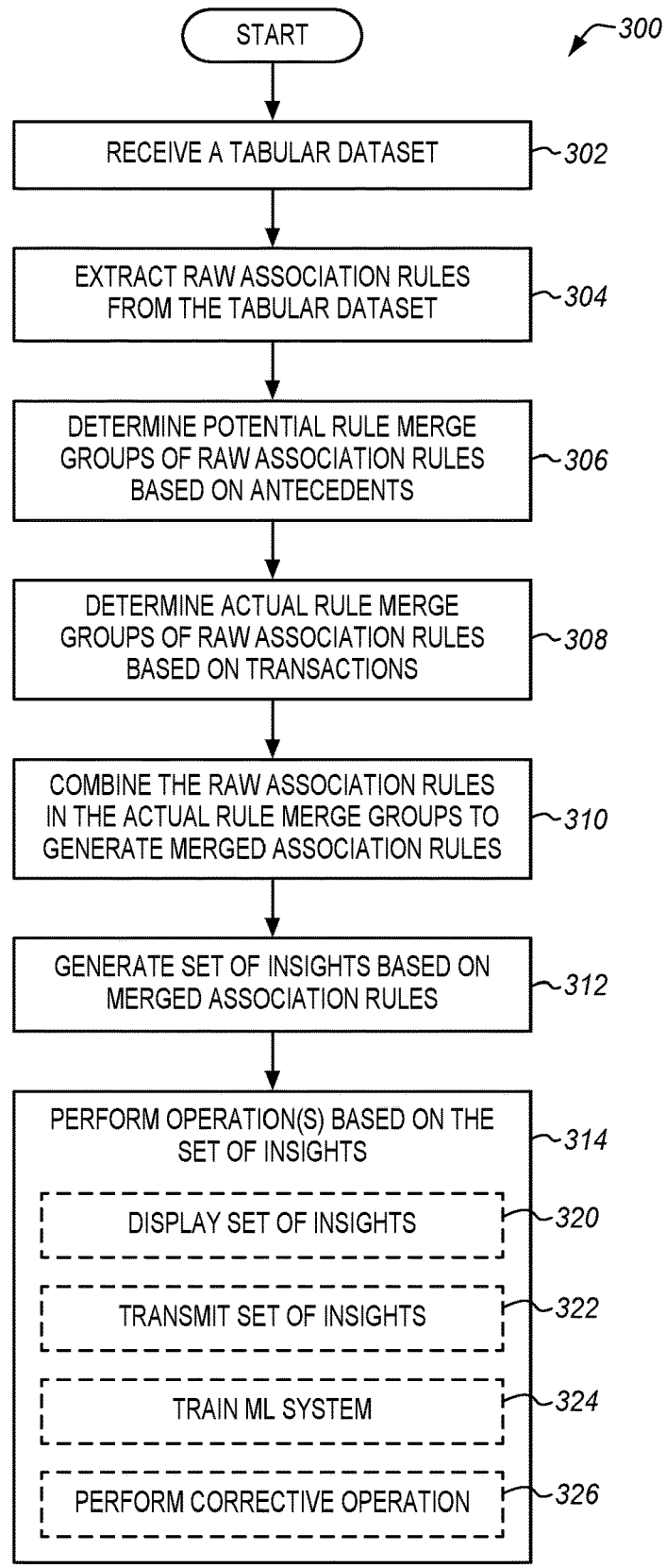
FIG. 3 is a flow chart illustrating a method of processing a tabular dataset in an illustrative embodiment.

FIG. 3 is a flow chart illustrating a method 300 of processing a tabular dataset 210 in an illustrative embodiment. The steps of method 300 will be described with reference to data mining system 100 in FIG. 1, but those skilled in the art will appreciate that method 300 may be performed in other systems. The steps of the flow charts described herein are not all inclusive and may include other steps not shown, and the steps may be performed in an alternative order.

Rules generator 102 receives a tabular dataset 210 (step 302). Tabular dataset 210 is data (e.g., raw data) that is structured into rows and columns. Rules generator 102 may receive or retrieve tabular dataset 210 from another system (e.g., a management system) through network interface component 122.

Figures 4, 5:
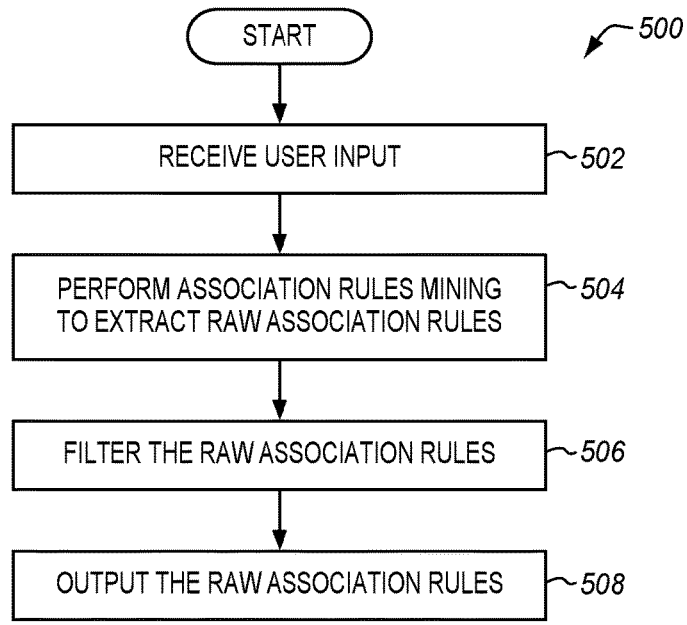
FIG. 4 illustrates a tabular dataset in an illustrative embodiment.
FIG. 5 is a flow chart illustrating a method of extracting raw association rules in an illustrative embodiment.

FIG. 4 illustrates tabular dataset 210 in an illustrative embodiment. Tabular dataset 210 is comprised of rows 402 and columns 404. The intersection of a row 402 and a column 404 is referred to as a transaction element 406. The number of rows 402 and columns 404 indicated in FIG. 4 is provided as an example. Each row 402 represents a distinct scenario, record, or transaction 410 for tabular dataset 210. For example, a transaction 410 may represent a customer of a network. A transaction 410 may also represent an aggregation of events, such as per customer, per day, per location, etc. Each of transactions 410 may be designated with a label or name (e.g., $t_1, t_2, \ldots, t_n$).

Columns 404 represent information, properties, or attributes collected for the transactions 410 of the rows 402. Each of columns 404 may have a header or attribute name as shown in FIG. 4. For example, columns 404 may be labeled as a phone model, wireless access technology, rate plan, cell location, packet loss, low service quality, dropped call, etc. The transaction elements 406 of a column 404 are populated with attribute values for its corresponding attribute. The attribute values are categorical (i.e., consisting of categorical or descriptive variables), or enumerated (i.e., representing a finite set of possible choices). If one or more of the attribute values are numerical values, for example, then rules generator 102 may categorize these attribute values using a categorization method. Rules generator 102 may pre-process tabular dataset 210 in other desired ways that are beyond the scope of this disclosure.

In one embodiment, tabular dataset 210 may be referred to as a "voluminous" or "large" dataset. In general, a voluminous or large dataset is too large or complex to be dealt with practically by a human. For example, a voluminous or large dataset may comprise at least hundreds or thousands of columns, and at least hundreds of thousands or millions of rows.

Figure 6:
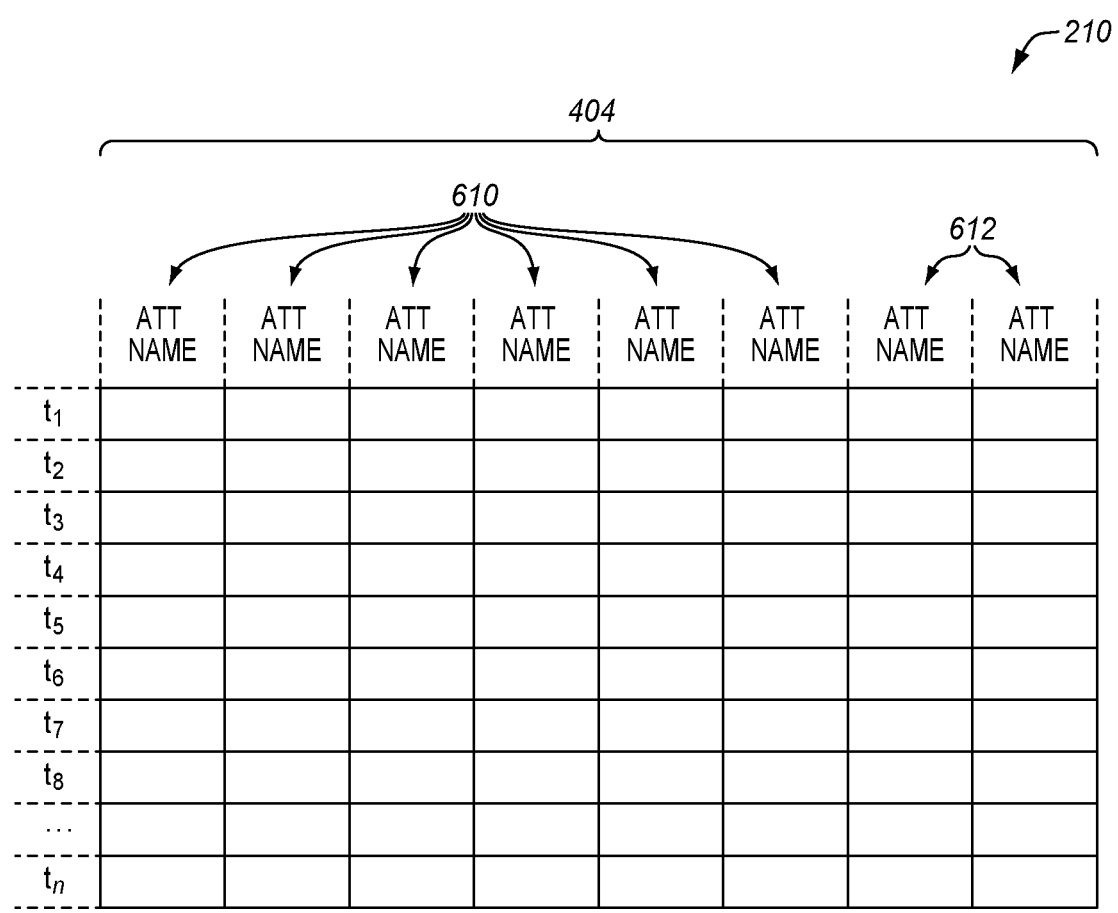
FIG. 6 illustrates antecedents and consequents in a tabular dataset in an illustrative embodiment.

In FIG. 3, rules generator 102 extracts raw association rules 212 from the tabular dataset 210 (step 304). FIG. 5 is a flow chart illustrating a method 500 of extracting raw association rules 212 in an illustrative embodiment. In this embodiment, rules generator 102 receives user input from a user (step 502), such as through user interface component 120. The user input may designate a set of columns 404 of tabular dataset 210 as antecedents, and a set of columns 404 of tabular dataset 210 as consequents. FIG. 6 illustrates antecedents and consequents in tabular dataset 210 in an illustrative embodiment. In this embodiment, rules generator 102 may query a user through user interface component 120, and receive user input designating which columns 404 are antecedents 610 and which columns 404 are consequents 612. For example, antecedents 610 may be a type of phone model, wireless access technology, rate plan, cell location, packet loss, etc., and consequents 612 may be a low service quality, dropped call, etc. The set of columns 404 designated as antecedents 610, and the set of columns 404 designated as consequents 612 may partially or fully overlap. It is noted that if columns 404 are not designated as antecedents and consequents, then rules generator 102 may use columns 404 as either antecedents or consequents. The user input may additionally or alternatively include other parameters or constraints.

In FIG. 5, rules generator 102 performs association rules mining (step 504) based on the user input (if provided). Thus, rules generator 102 runs an algorithm to extract a set of raw association rules 212 from tabular dataset 210. For example, rules generator 102 may run an Apriori algorithm, Eclat algorithm, FP-growth algorithm, or another type of association rules mining algorithm to extract the raw association rules 212. Each raw association rule 212 provides an association between a set (i.e., one or more) of antecedents 610, and a single consequent 612 (i.e., singleton consequent). Each raw association rule 212 also corresponds to one or more transactions 410. A raw association rule 212 may be expressed as follows:

$$R_1: a_1, a_2, \ldots, a_k \rightarrow c_1 \text{ corresponding to transactions } T_1$$

In this expression, "$a_1 \ldots a_k$" are the antecedents of consequent "$c_1$". Also, $T_1$ is a set of one or more transactions $t_i$ from rows 402 in tabular dataset 210 that are covered by rule $R_1$. It is to be understood that $T_1$ is interchangeably referred to as "transactions" or "set of transactions", without loss of generality.

Rules generator 102 may also generate performance metrics associated with the raw association rules 212, such as confidence, support, and lift, according to the association rules mining algorithm. The confidence (Conf($R_1$)) of a raw association rule 212 measures how likely the consequent ($c_1$) is given the antecedents ($a_1 \ldots a_k$) observed. A confidence of 100% means that the consequent is certain when the antecedents are found in the transaction. Lower confidence levels indicate higher chances of a false positive of that consequent. The support (Supp($R_1$)) of a raw association rule 212 measures the total number of (or, alternatively, ratio of) transactions 410 in the tabular dataset 210 that the raw association rule 212 represents. Depending on the scenario, a user may be more interested in raw association rules 212 that represent a greater number of transactions 410. The lift (Lift($R_1$)) of a raw association rule 212 measures the increase in the probability of a consequent ($c_1$), given that the antecedents ($a_1 \ldots a_k$) are observed. Thus, a good raw association rule 212 should have a lift that is greater than 1, by as much as possible. Rules generator 102 may output the performance metrics for each raw association rule 212.

In another embodiment, the performance metrics may also represent a constraint in the user input to rules generator 102 (see step 502). For example, a user may specify a minimum confidence, support, and lift, which rules generator 102 receives as user input to the association rules mining algorithm. These requirements are usually based on business objectives. Rules generator 102 may also receive as user input, a minimum number of antecedents required for each consequent. This may avoid situations like singleton relationships, thus reducing the scale of the set of insights 220 extracted from tabular dataset 210.

The result of association rules mining in step 504 is an initial set of raw association rules 212. Rules generator 102 may then filter the initial set of raw association rules 212 (step 506). For example, rules generator 102 may filter the initial set of raw association rules 212 to retain closed association rules and remove redundant association rules. For example, consider the following three association rules:

$$R_1: a_1 \rightarrow c_1 \text{ with support 50\%}$$

$$R_2: a_1, a_2 \rightarrow c_1 \text{ with support 50\%}$$

$$R_3: a_1, a_2, a_3, a_4 \rightarrow c_1 \text{ with support 50\%}$$

Here, association rules $R_1$ and $R_2$ are not closed association rules as they are subsets of association rule $R_3$ and have identical support. Thus, rules generator 102 may exclude association rules $R_1$ and $R_2$ from the set of raw association rules 212 as they do not provide any different information compared to association rule $R_3$.

Further, consider the following two association rules:

$$R_4: a_7, a_8 \rightarrow c_2 \text{ with confidence 75\%}$$

$$R_5: a_7, a_8, a_9 \rightarrow c_2 \text{ with confidence 71\%}$$

Here, association rule $R_5$ is redundant with association rule $R_4$ because it is stricter (requiring an additional antecedent for the same consequent), but has lower confidence. Thus, rules generator 102 may exclude association rule $R_5$ from the set of raw association rules 212.

After step 506, rules generator 102 has identified a set of W raw association rules (i.e., $R_1 \ldots R_W$) with singleton consequents and associated confidence, support, and lift performance metrics. Rules generator 102 then outputs the raw association rules 212 with their associated performance metrics (step 508).

After extracting the raw association rules 212 in FIG. 3, rules combiner 104 attempts to combine at least some of the raw association rules 212 as described below. To do so, rules combiner 104 determines a set (one or more) of potential rule merge groups 214 based on the antecedents 610 of the raw association rules 212 (step 306). A potential rule merge group is a grouping or set of two or more rules (e.g., raw association rules 212) that are potentially combinable. In step 306, a determination of whether two or more raw association rules 212 are potentially combinable is based on a common set of antecedents 610.

For each potential rule merge group 214, rules combiner 104 determines a set of (one or more) actual rule merge groups 216 based on the transactions 410 of the raw association rules 212 in the potential rule merge group 214 (step 308). An actual rule merge group is a grouping or set of two or more raw association rules 212 from a potential rule merge group 214 that are combinable based on a common set of transactions 410.

Figure 7:
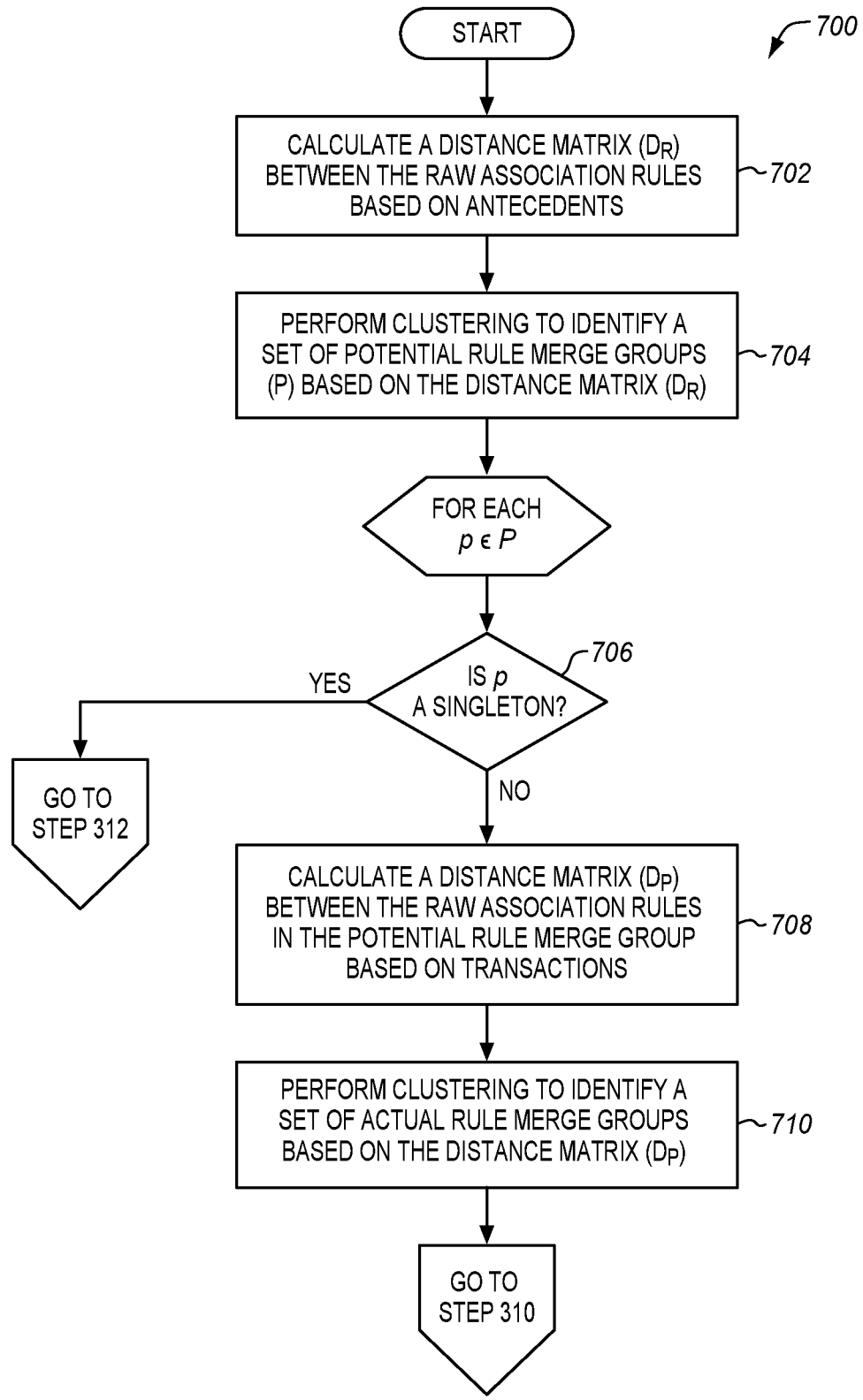
FIG. 7 is a flow chart illustrating a method of determining potential rule merge groups and actual rule merge groups in an illustrative embodiment.

FIG. 7 is a flow chart illustrating a method 700 of determining potential rule merge groups 214 and actual rule merge groups 216 in an illustrative embodiment. In this embodiment, rules combiner 104 calculates a distance matrix between the raw association rules 212 based on antecedents 610 (step 702). For this calculation, rules combiner 104 may use Jaccard similarity to compute distances between two sets of discrete objects $S_1$ and $S_2$. This similarity is defined as:

$$J(S_1, S_2) = |S_1 \cap S_2| / |S_1 \cup S_2|$$

The distance is defined as:

$$d(S_1, S_2) = 1 - J(S_1, S_2).$$

Thus, if two sets are identical, their Jaccard similarity is "1" and their distance is "0".

Consider the following set of raw association rules 212 as an example:

$$R_6: a_7, a_8 \rightarrow c_3 \text{ corresponding to transactions } T_6$$

$$R_7: a_7, a_8, a_9 \rightarrow c_4 \text{ corresponding to transactions } T_7$$

$$R_8: a_{10}, a_{11} \rightarrow c_4 \text{ corresponding to transactions } T_8$$

$$R_9: a_7, a_8, a_{12} \rightarrow c_5 \text{ corresponding to transactions } T_9$$

$$R_{10}: a_7, a_8 \rightarrow c_6 \text{ corresponding to transactions } T_{10}$$

$$R_{11}: a_{11}, a_{12}, a_{13} \rightarrow c_7 \text{ corresponding to transactions } T_{11}$$

In this set of raw association rules 212, it appears based on observation that rules $R_6$, $R_7$, $R_9$, $R_{10}$ are potentially mergeable based on a common set of antecedents 610. Rules combiner 104 calculates the distance matrix $D_R$ based on the pair-wise distance between the antecedents 610 of each raw association rule 212. Thus, $D_R(i,j)=d(R_i, R_j)$, where $d(R_i, R_j)=1-J(R_i, R_j)$ based on the Jaccard similarity between the sets of antecedents 610 of each pair of raw association rules 212. For the above example, $d(R_6, R_7)=\frac{1}{3}$, $d(R_6, R_8)=1$, and $d(R_6, R_{10})=0$.

Rules combiner 104 then performs hierarchical clustering to identify a set of potential rule merge groups 214 based on the distance matrix $D_R$ (step 704). During clustering, random selection may be employed as a tie-breaker to assign raw association rules 212 to clusters if identical distances are present. Rules combiner 104 may use a technique of maximizing the silhouette metric to determine an optimal number of clusters to select. The silhouette metric measures the difference between the clusters, and it is a value between 0 and 1. Rules combiner 104 selects a silhouette threshold based on antecedents 610, denoted by $\tau_s$, to determine if the clusters will be broken or not (i.e., no merging will be performed at this step). The value of $\tau_s=1$ would mean that raw association rules 212 can be potentially merged only if their antecedents 610 are identical, but experimentation shows that $\tau_s \geq 0.8$ to 0.9 may be preferred. The clusters represent the potential rule merge groups 214 (P) that can be potentially merged since they share a significant number of antecedents 610.

At the end of step 704, rules combiner 104 produces potential rule merge groups 214 from the raw association rules 212. Assume, for example, that the following potential rule merge groups 214 are identified as:

$P_1=\{R_6, R_{10}, R_7, R_9\}$ $P_2=\{R_{11}\}$ $P_3=\{R_8\}$

In this example, groups $P_2$ and $P_3$ are each a singleton (i.e., consists of a single association rule), and group $P_1$ is a non-singleton having a plurality of raw association rules 212. A potential rule merge group 214 that is a singleton cannot be merged, as there is only one raw association rule 212 in the group. Within a potential rule merge group 214 that is a non-singleton, the raw association rules 212 can be potentially merged when they have a significant number of common transactions 410. Thus, for each potential rule merge group 214 (p) in the set of potential rule merge groups 214 ($p \in P$), rules combiner 104 determines whether the potential rule merge group 214 is a singleton (step 706). When the potential rule merge group 214 is a singleton, this group does not include multiple raw association rules 212 that can be combined. The raw association rule 212 in a singleton potential rule merge group 214 may therefore be added to the set of insights 220 (see step 312 of FIG. 3) without any merging with other rules. When the potential rule merge group 214 is a non-singleton, rules combiner 104 determines which of the raw association rules 212 in the potential rule merge group 214 are mergeable based on the transactions 410 of the raw association rules 212. To do so, rules combiner 104 calculates a distance matrix between the raw association rules 212 in the potential rule merge group 214 based on the transactions 410 of the raw association rules 212 in the potential rule merge group 214 (step 708). For each non-singleton group ($p \in P$), let R(p) be the set of raw association rules 212 within that potential rule merge group 214. Rules combiner 104 calculates a distance matrix $D_p$ based on pairwise distances between the transaction sets of each raw association rule 212 in R(p). Thus, $D_p(i, j)=d(R_i, R_j)$, where $d(R_i, R_j)=1-J(R_i, R_j)$ based on the Jaccard similarity between the sets of transactions 410 of each pair of raw association rules 212. In the above example, potential rule merge group $P_1$ corresponds with transactions $T_6$, $T_{10}$, $T_7$, $T_9$.

Rules combiner 104 then performs hierarchical clustering to identify a set of actual rule merge groups 216 based on the distance matrix $D_p$ (step 710). Rules combiner 104 may select a silhouette threshold based on transactions 410, denoted by $\tau_t$, to determine whether the clusters will be broken or not (i.e., no merging will be performed at this step). The value of $\tau_t$ may be an input by the user, but experimentation shows that $\tau_t = \tau_s$ or a slightly lower number may be preferred. A selection of $\tau_t=1$ would mean that raw association rules 212 will be merged only if their transactions 410 are identical, which may be too restrictive of a choice. Assume from potential rule merge group $P_1$ discussed above, rules combiner 104 determines one actual rule merge group 216 that includes raw association rules $R_6$ and $R_{10}$, and another actual rule merge group 216 that includes association rules $R_7$ and $R_9$.

Figure 8:
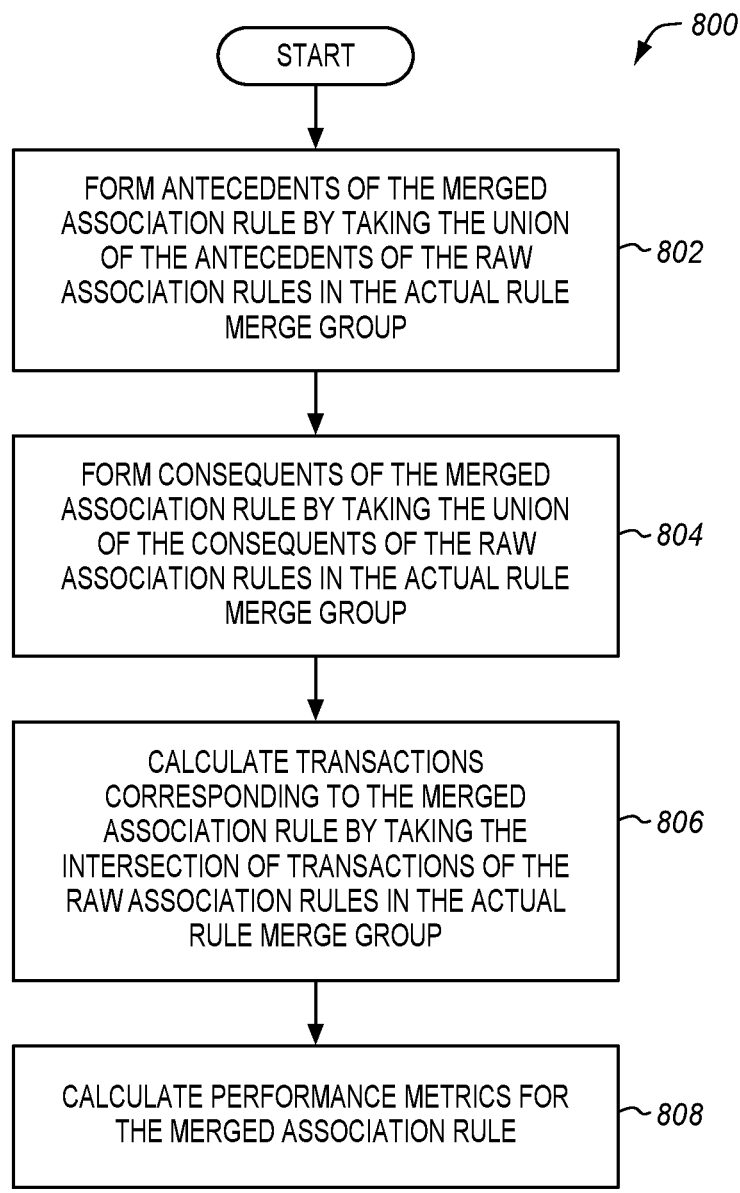
FIG. 8 is a flow chart illustrating a method of combining raw association rules to form a merged association rule in an illustrative embodiment.

Method 700 repeats for each potential rule merge group 214 in the set of potential rule merge groups 214. The result is a set of actual rule merge groups 216 where the raw association rules 212 are combinable within each actual rule merge groups 216. In FIG. 3, rules combiner 104 combines the raw association rules 212 in the actual rule merge groups 216 to produce or generate merged association rules 218 (step 310). A merged association rule comprises a combination of two or more raw association rules 212. FIG. 8 is a flow chart illustrating a method 800 of combining raw association rules 212 to form a merged association rule 218 in an illustrative embodiment. Assume for this example that two or more raw association rules 212 (e.g., $R_i$, $R_j$, ... $R_k$) from an actual rule merge group 216 are merged to produce a merged association rule 218 (e.g., $\bar{R}_x$). Rules combiner 104 forms the antecedents 610 of the merged association rule 218 by taking the union of the antecedents 610 of the raw association rules 212 in the actual rule merge group 216 (e.g., $\{a_x\}=\cup(\{a_i\}, \{a_j\}, \ldots, \{a_k\})$), as in step 802. Similarly, rules combiner 104 forms consequents 612 of the merged association rule 218 by taking the union of the consequents 612 of the raw association rules 212 in the actual rule merge group 216 (e.g., $\{c_x\}=\cup(\{c_i\}, \{c_j\}, \ldots, \{c_k\})$), as in step 804. Rules combiner 104 calculates the set of transactions 410 corresponding to the merged association rule 218 by taking the intersection of the transactions 410 of the raw association rules 212 in the actual rule merge group 216 (step 806). For the example provided above, assume that a merged rule $\bar{R}_1$ is formed by merging raw association rules $R_6$ and $R_{10}$. Raw association rule $R_6$ corresponds with transactions $T_6$, and raw association rule $R_{10}$ corresponds with transactions $T_{10}$. And it is noted that each set of transactions may be comprised of one or more transactions 410 (e.g., $T_6$: $t_1, t_2, \ldots, t_k$ and $T_{10}$: $t_1, t_2, \ldots, t_q$). Rules combiner 104 calculates the transactions 410 corresponding to the merged association rule 218 by taking the intersection of the transactions 410 across each of the raw association rules 212 (e.g., $T_{\bar{R}_1}=T_6 \cap T_{10}$). Rules combiner 104 also calculates performance metrics for the merged association rule $\bar{R}_1$ (step 808), which are referred to as the equivalent confidence, equivalent support, and equivalent lift for merged association rule $\bar{R}_1$. Rules combiner 104 may repeat method 800 for each of the actual rule merge groups 216 to generate a plurality of merged association rules 218.

In FIG. 3, rules combiner 104 constructs, generates, or forms the set (M) of insights 220 based on one or more of the merged association rules 218 (step 312). An insight 220 may therefore comprise a merged association rule 218 having multiple antecedents 610 and multiple consequents 612. Rules combiner 104 may also construct, generate, or form the set of insights 220 based on non-merged association rules 219, such as one or more raw association rules 212 in potential rule merge groups 214 that were found to be singletons, and/or one or more raw association rules 212 in potential rule merge groups 214 that could not be merged with other rules. Thus, an insight 220 may also comprise a raw association rule 212 having one or more antecedents 610 and a single consequent 612. As an example, the set of insights 220 may be as follows:

$\overline{R}_1$: $a_7, a_8 \rightarrow c_3, c_6$ corresponding to transactions
$\overline{T}_1 = T_6 \cap T_{10}$ $\overline{R}_2$: $a_7, a_8, a_9, a_{12} \rightarrow c_4, c_5$ corresponding to transactions
$\overline{T}_2 = T_7 \cap T_9$ $\overline{R}_3$: $a_{10}, a_{11} \rightarrow c_4$ corresponding to transactions $\overline{T}_3 = T_{11}$ $\overline{R}_4$: $a_{11}, a_{12}, a_{13} \rightarrow c_7$ corresponding to transactions
$\overline{T}_4 = T_8$ Merging of at least some of the raw association rules 212 extracted from tabular dataset 210 provides a technical benefit in that a smaller-scale set of insights 220 may be gleaned from tabular dataset 210. These insights 220 may be more human-friendly or may be processed more efficiently than the raw association rules 212 because they carry concurrent messages (not just singleton consequents) at a reduced scale compared to the raw association rules 212.

Insight handler 106 then performs one or more operations, actions, or functions based on the set of insights 220 (step 314). For example, insight handler 106 may display the set of insights 220 to a user through user interface component 120 (optional step 320). Insight handler 106 may transmit the set of insights 220 to another system, such as a management system, over a network through network interface component 122 (optional step 322). Insight handler 106 may transmit the set of insights 220 to ML system 124 to train ML model 126 with the set of insights 220 (optional step 324). Insight handler 106 may process the set of insights 220, and automatically perform a corrective action or preventative action to address a consequent(s) 612 of an insight 220, or may send control signals to another system, such as a management system, over a network through network interface component 122 instructing the other system to perform a corrective action or preventative action to address a consequent(s) 612 of an insight 220 (optional step 326).

As a practical example, assume that the set of insights 220 are about conditions leading to poor audio/video quality in home TV services, and are generated and used as part of an automated, proactive network management system incorporating insight handler 106. When insight handler 106 identifies that current conditions (antecedents) match predicted adverse outcomes (consequents) as defined in the set of insights 220, it automatically performs corrective actions ranging in severity from minor impact actions (e.g., notifying the customer), medium impact actions (e.g., resetting the home network and devices), and high impact actions (e.g., mobilization of the field force to remedy the situation). In another practical example, assume that the set of insights 220 are generated about the factors affecting the success of device firmware upgrade campaigns in wireless service providers. Insight handler 106 identifies factors (antecedents) that lead to canceled, aborted, or failed firmware upgrades (consequents). These insights 220 are displayed to the campaign auditor through user interface component 120, and the auditor uses these insights 220 to reach out to the device manufacturer to mitigate the factors leading to unsuccessful firmware upgrades.

Figure 9:
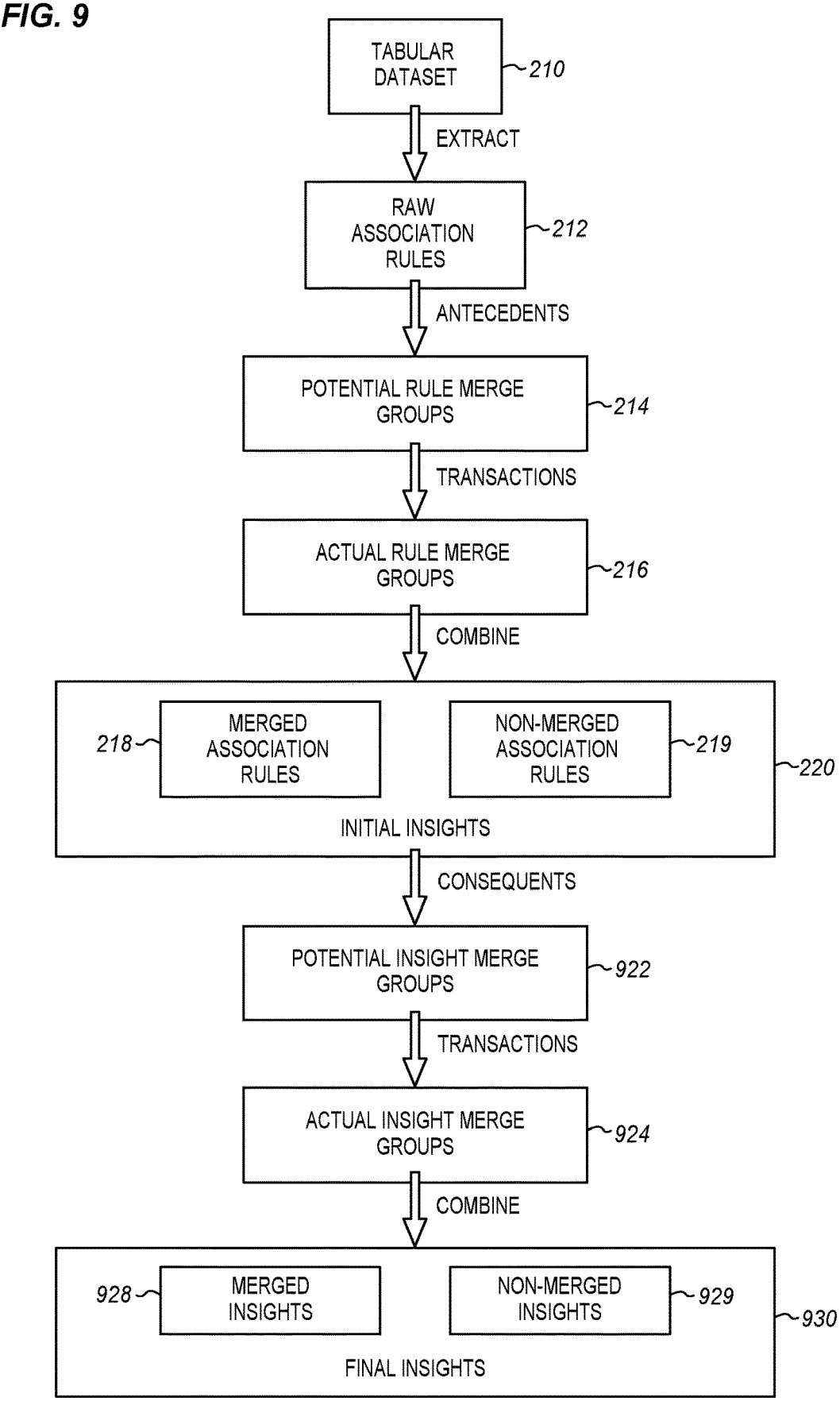
FIG. 9 is a block diagram showing an overview of an end-to-end mining process in another illustrative embodiment.

In another embodiment, the end-to-end mining process described herein may further include attempting to combine insights 220 to further reduce the scale of the set of insights 220. FIG. 9 is a block diagram showing an overview of the end-to-end mining process in another illustrative embodiment. As in FIG. 2, data mining system 100 extracts a set of raw association rules 212 from the tabular dataset 210, identifies groups of raw association rules 212 (i.e., potential rule merge groups 214) that are potentially combinable based on similarities in the antecedents of the raw association rules 212, and identifies which of the raw association rules 212 are actually combinable based on the transactions associated with the raw association rules 212 (i.e., actual rule merge groups 216). Data mining system 100 then combines raw association rules 212 in the actual rule merge groups 216 to form merged association rules 218. As described above, the merged association rules 218 and optionally non-merged association rules 219 form the set of insights 220.

In this embodiment, data mining system 100 attempts to combine or merge at least some of the insights 220 based on similarities between the insights 220. For the sake of clarity, the set of insights 220 produced above may be referred to as initial insights 220. Data mining system 100 identifies groups of initial insights 220 (i.e., potential insight merge groups 922) that are potentially combinable based on similarities in the consequents 612 of the initial insights 220, and identifies which of the initial insights 220 are actually combinable based on the transactions 410 associated with the initial insights 220 (i.e., actual insight merge groups 924). Data mining system 100 then combines initial insights 220 in the actual insight merge groups 924 to form merged insights 928. The merged insights 928 represent at least part of a set of final insights 930 gleaned from the tabular dataset 210. As will be described in more detail below, some of the initial insights 220 that cannot be merged may also represent part of the set of final insights 930 (i.e., non-merged insights 929).

Figure 10:
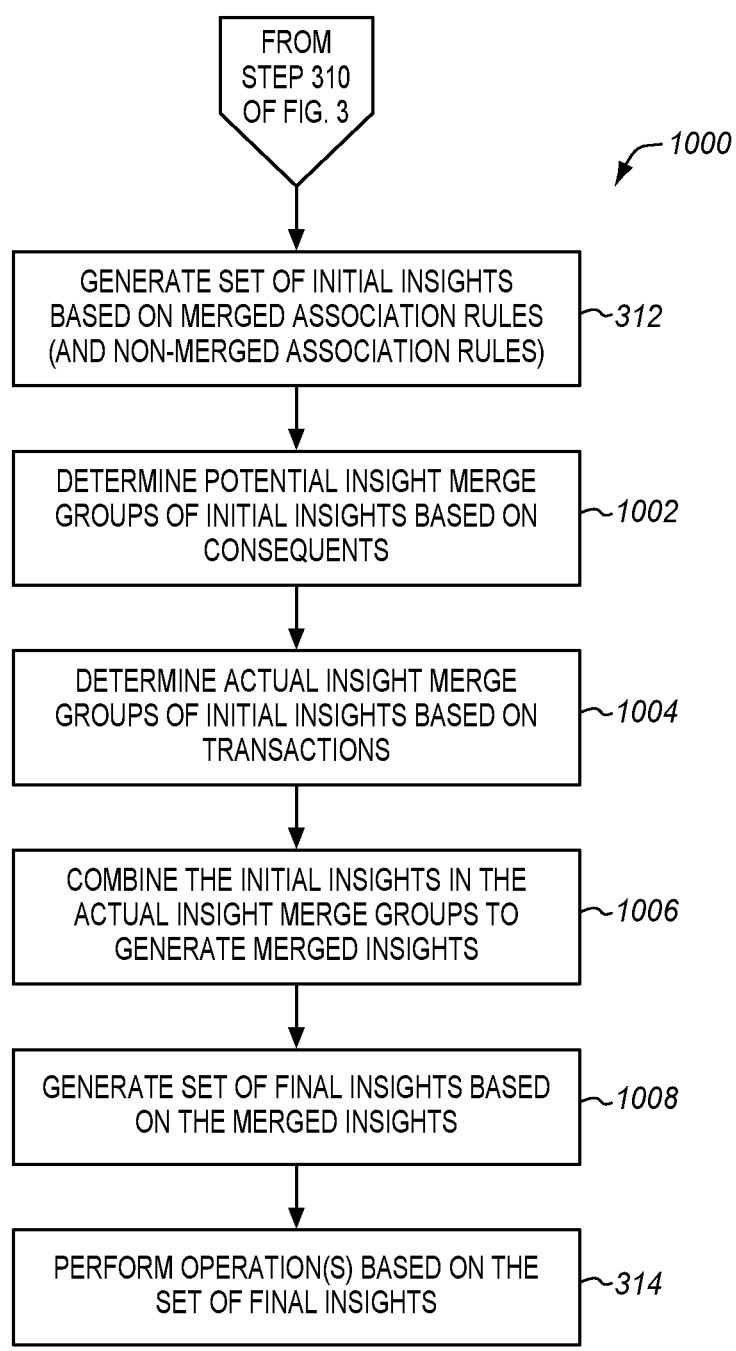
FIG. 10 is a flow chart illustrating a method of processing a tabular dataset in another illustrative embodiment.

FIG. 10 is a flow chart illustrating a method 1000 of processing a tabular dataset 210 in another illustrative embodiment. Method 1000 adds additional detail to method 300 described in FIG. 3, and begins from step 312 where rules combiner 104 generates a set of initial insights 220 based on merged association rules 218, and possibly based on non-merged association rules 219. Rules combiner 104 may then attempt to combine the initial insights 220 based on commonalities in the consequents 612. Thus, rules combiner 104 determines a set (one or more) of potential insight merge groups 922 based on the consequents 612 of the initial insights 220 (step 1002). A potential insight merge group is a grouping or set of two or more rules (e.g., initial insights 220) that are potentially combinable. In step 1002, a determination of whether two or more initial insights 220 are potentially combinable is based on a common set of consequents 612.

For each potential insight merge group 922, rules combiner 104 determines a set of (one or more) actual insight merge groups 924 based on the transactions 410 of the initial insights 220 in the potential insight merge group 922 (step 1004). An actual insight merge group 924 is a grouping or set of two or more initial insights 220 from a potential insight merge group 922 that are combinable based on a common set of transactions 410.

Figure 11:
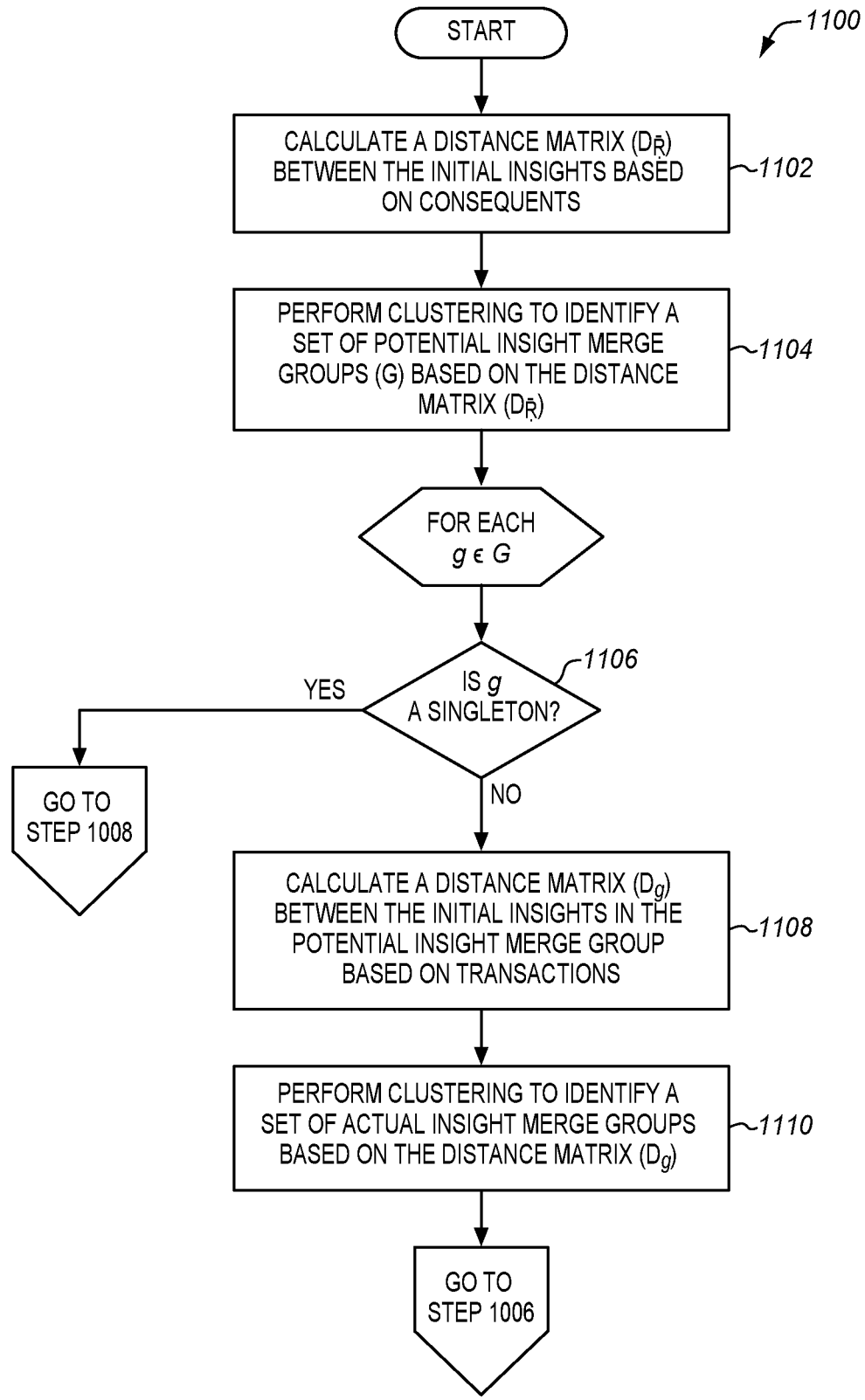
FIG. 11 is a flow chart illustrating a method of determining potential insight merge groups and actual insight merge groups in an illustrative embodiment.

FIG. 11 is a flow chart illustrating a method 1100 of determining potential insight merge groups 922 and actual insight merge groups 924 in an illustrative embodiment. In this embodiment, rules combiner 104 calculates a distance matrix between the initial insights 220 based on consequents 612 of the initial insights 220 (step 1102). The following is an example of the set of initial insights 220:

$\overline{R}_1$: $a_7, a_8 \rightarrow c_3, c_6$ corresponding to transactions $\overline{T}_1$ $\overline{R}_2$: $a_7, a_8, a_9, a_{12} \rightarrow c_4, c_5$ corresponding to transactions $\overline{T}_2$ $\overline{R}_3$: $a_{10}, a_{11} \rightarrow c_4$ corresponding to transactions $\overline{T}_3$ $\overline{R}_4$: $a_{11}, a_{12}, a_{13} \rightarrow c_7$ corresponding to transactions $\overline{T}_4$ $\overline{R}_5$: $a_{14}, a_{15} \rightarrow c_3, c_6$ corresponding to transactions $\overline{T}_5$ $\overline{R}_6$: $a_7, a_8, a_{14}, a_{16} \rightarrow c_3, c_6, c_7$ corresponding to transactions $\overline{T}_6$ $\overline{R}_7$: $a_{16}, a_{17} \rightarrow c_4$ corresponding to transactions $\overline{T}_7$ $\overline{R}_8$: $a_{11}, a_{18} \rightarrow c_7$ corresponding to transactions $\overline{T}_8$ $\overline{R}_9$: $a_{19}, a_{20} \rightarrow c_7$ corresponding to transactions $\overline{T}_9$ $\overline{R}_{10}$: $a_{21}, a_{22} \rightarrow c_8, c_9$ corresponding to transactions $\overline{T}_{10}$ Rules combiner 104 calculates the distance matrix $D_{\overline{R}}$ based on the pair-wise distance between the consequents 612 of each initial insight 220.

Rules combiner 104 then performs hierarchical clustering to identify a set of potential insight merge groups 922 based on the distance matrix $D_{\overline{R}}$ (step 1104). Rules combiner 104 may perform hierarchical clustering based on a silhouette threshold, denoted by $\tau_s$. The silhouette threshold may be different than used above, and this silhouette threshold may be made more stringent as some merging has already occurred.

At the end of step 1104, rules combiner 104 produces potential insight merge groups 922 (G) from the initial insights 220. Assume, for example, that the following potential insight merge groups 922 are identified:

$G_1 = \{\overline{R}_1, \overline{R}_5, \overline{R}_6\}$ $G_2 = \{\overline{R}_2, \overline{R}_3, \overline{R}_7\}$ $G_3 = \{\overline{R}_4, \overline{R}_8, \overline{R}_9\}$ $G_4 = \{\overline{R}_{10}\}$ In this example, group $G_4$ is a singleton, and the other groups are non-singletons having a plurality of initial insights 220. A potential insight merge group 922 that is a singleton cannot be merged, as there is only one initial insight 220 in the group. Within a potential insight merge group 922 that is a non-singleton, the initial insights 220 can be potentially merged if they have a significant number of common consequents 612. Thus, for each potential insight merge group 922 (g) in the set of potential insight merge groups 922 (g∈G), rules combiner 104 determines whether the potential insight merge group 922 is a singleton (step 1106). When the potential insight merge group 922 is a singleton, this group does not include multiple initial insights 220 that can be combined. The initial insight 220 in a singleton potential insight merge group 222 may therefore be added to the set of final insights 930 (see step 1008 of FIG. 10) without any merging with other insights. When the potential insight merge group 922 is a non-singleton, rules combiner 104 determines which of the initial insights 220 in the potential insight merge group 922 are mergeable based on the transactions 410 of the initial insights 220. To do so, rules combiner 104 calculates a distance matrix between the initial insights 220 in the potential insight merge group 922 based on the transactions 410 of the initial insights 220 in the potential insight merge group 922 (step 1108). For each non-singleton group (g∈G), rules combiner 104 calculates a distance matrix $D_g$ based on pairwise distances between the transaction sets of each initial insight 220. Rules combiner 104 then performs hierarchical clustering to identify actual insight merge groups 924 based on the distance matrix $D_g$ (step 1110). As above, rules combiner 104 may perform hierarchical clustering based on a silhouette threshold $\tau_t$ to determine which of the initial insights 220 in each potential insight merge group 924 can be further merged. This threshold may be the same or different than the threshold used above.

Method 1100 repeats for each potential insight merge group 922 in the set of potential insight merge groups 922. The result is a set of actual insight merge groups 924 where the initial insights 220 are combinable within each actual insight merge group 924.

Assume, from the above example, that rules combiner 104 determines an actual insight merge group 924 that includes insights $\overline{R}_1$, $\overline{R}_5$, and $\overline{R}_6$ within potential insight merge group $G_1$, determines an actual rule merge group 924 that includes insights $\overline{R}_2$ and $\overline{R}_7$ within potential insight merge group $G_2$, and determines an actual insight merge group 924 that includes insights $\overline{R}_4$ and $\overline{R}_8$ within potential insight merge group $G_3$.

Figure 12:
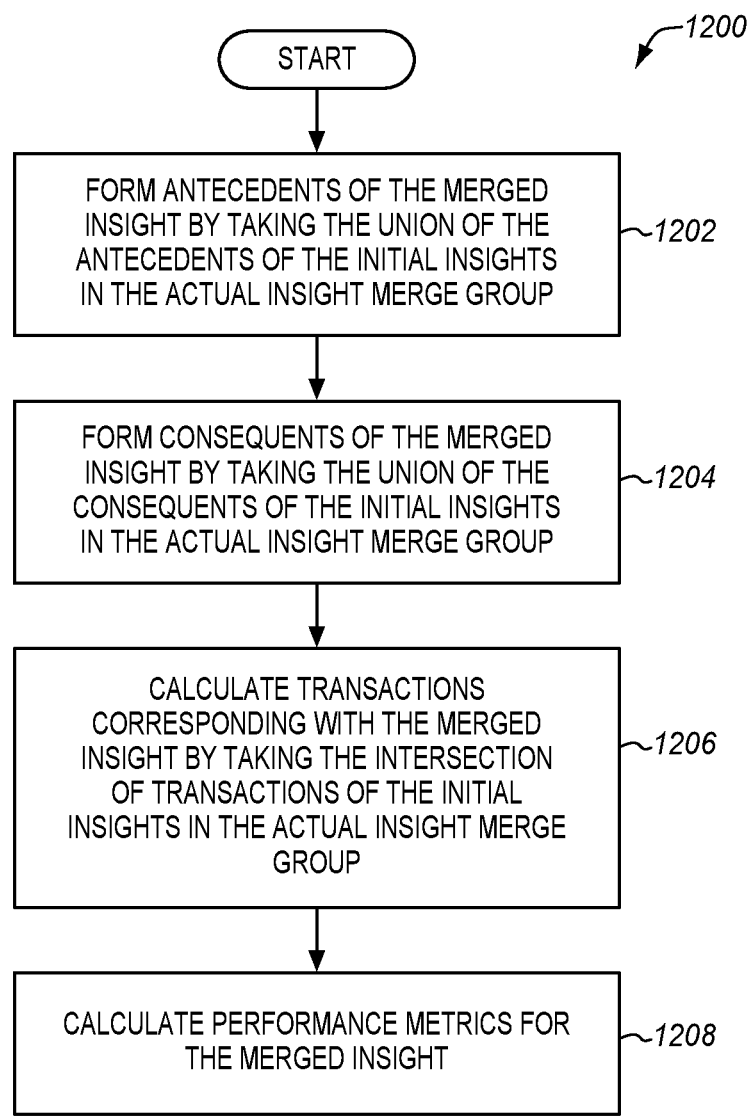
FIG. 12 is a flow chart illustrating a method of combining initial insights to form a merged insight in an illustrative embodiment.

In FIG. 10, rules combiner 104 combines the initial insights 220 in the actual insight merge groups 924 to produce or generate merged insights 928 (step 1006). A merged insight comprises a combination of two or more initial insights 220. FIG. 12 is a flow chart illustrating a method 1200 of combining initial insights 220 to form a merged insight 928 in an illustrative embodiment. Assume for this example that two or more initial insights 220 (e.g., $\overline{R}_i, \overline{R}_j, \ldots \overline{R}_k$) from an actual insight merge group 924 are merged to produce a merged insight 928 (e.g., $\overline{R}_x$). Rules combiner 104 forms the antecedents 610 of the merged insight 928 by taking the union of the antecedents 610 of the initial insights 220 within the actual insight merge group 924 (step 1202). Similarly, rules combiner 104 forms consequents 612 of the merged insight 928 by taking the union of the consequents 612 of the initial insights 220 within the actual insight merge group 924 (step 1204). Rules combiner 104 calculates the transactions 410 corresponding to the merged insight 928 by taking the intersection of the transactions 410 across each of the initial insights 220 within the actual insight merge group 924 (step 1206). Rules combiner 104 also calculates performance metrics for the merged insight 928 (step 1208), such as the equivalent confidence, equivalent support, and equivalent lift for the merged insight 928. Rules combiner 104 may repeat method 1200 for each of the actual insight merge groups 924 to generate a plurality of merged insights 928.

In FIG. 10, rules combiner 104 constructs, generates, or forms the set (N) of final insights 930 based on one or more of the merged insights 928 (step 1008). A final insight 930 may therefore comprise a merged insight 928 having multiple consequents 612 and potentially a combined set of antecedents 610 per each set of multiple consequents 612. Rules combiner 104 may also construct, generate, or form the set of final insights 930 based on non-merged insights 929, such as one or more initial insights 220 in potential insight merge groups 922 that were found to be singletons, and/or one or more initial insights 220 in potential insight merge groups 922 that could not be merged with other initial insights. As an example, the set of final insights 930 may be as follows:

$\overline{R}_1$: $a_7, a_8, a_{14}, a_{15}, a_{16} \rightarrow c_3, c_6, c$ corresponding to transactions $\overline{T}_1 = T_1 \cap T_5 \cap T_6$ $\overline{R}_2$: $a_7, a_8, a_9, a_{12}, a_{16}, a_{17} \rightarrow c_4, c_5$ corresponding to transactions $\overline{T}_2 = \overline{T}_2 \cap T_7$ $\overline{R}_3$: $a_{10}, a_{11} \rightarrow c_4$ corresponding to transactions $\overline{T}_3 = T_3$ $\overline{R}_4$: $a_{11}, a_{12}, a_{13}, a_{18} \rightarrow c_7$ corresponding to transactions $\overline{T}_4 = T_4 \cap T_8$ $\overline{R}_5$: $a_{19}, a_{20} \rightarrow c_7$ corresponding to transactions $\overline{T}_5 = T_9$ $\overline{R}_6$: $a_{21}, a_{22} \rightarrow c_8, c_9$ corresponding to transactions $\overline{T}_6 = T_{10}$ The number of final insights 930 is expected to be less than the number of initial insights 220 (N<M<W). Thus, merging of initial insights 220 has a technical benefit of further reducing the scale of the set of final insights 930 as compared to the set of raw association rules 212 and the set of initial insights 220.

Insight handler 106 then performs one or more operations, actions, or functions based on the set of final insights 930 (step 314).

Figure 13:
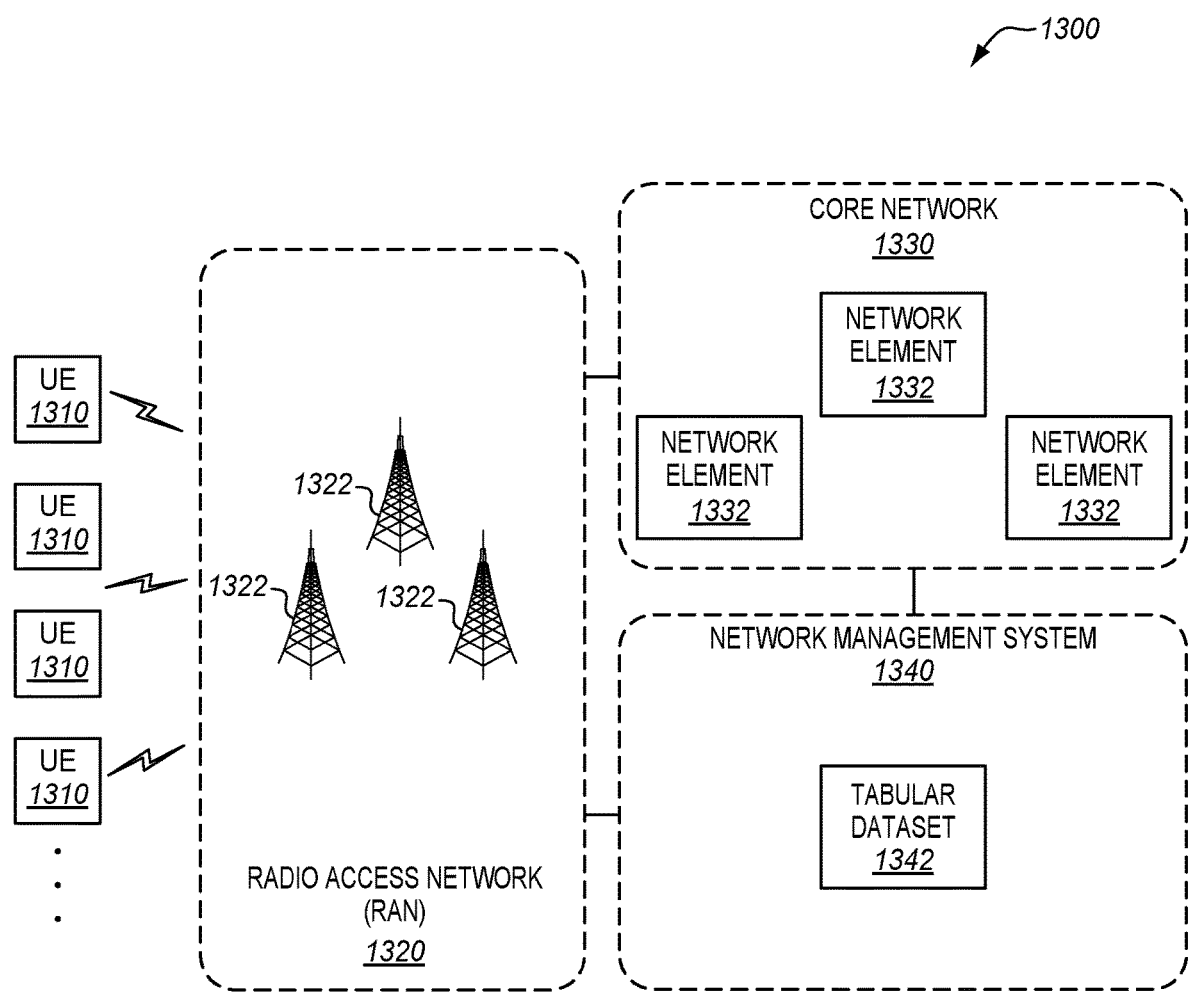
FIG. 13 illustrates a communication system in an illustrative embodiment.

As described above, data mining system 100 may be used to process data from a wireless service provider or the like. FIG. 13 illustrates a communication system 1300 in an illustrative embodiment. Communication system 1300 is a cellular network or mobile network where the last link is wireless, and provides voice and/or data services to a plurality of devices. Communication system 1300 may be a Fourth Generation (4G) network (e.g., a Long Term Evolution (LTE) network), a next-generation network (e.g., 5G or later), or another type of network. Communication system 1300 is illustrated as providing communication services to User Equipment (UE) 1310. UEs 1310 may be enabled for voice services, data services, Machine-to-Machine (M2M) or Machine Type Communications (MTC) services, and/or other services.

Communication system 1300 includes one or more Radio Access Networks (RAN) 1320 that communicate with UEs 1310 over a radio interface. RAN 1320 may support Evolved-UMTS Terrestrial Radio Access Network (E-UTRAN) access, Wireless Local Area Network (WLAN) access, new Radio Access Technologies (RAT), etc. RAN 1320 includes a plurality of base stations 1322 that are dispersed over a geographic area. A base station 1322 comprises an entity that uses radio communication technology to communicate with a UE 1310, and interface the UE 1310 with a core network 1330. One or more of base stations 1322 may comprise an Evolved-NodeB (eNodeB) of an E-UTRAN. In another embodiment, one or more of base stations 1322 may comprise a gNodeB (NR base stations) and/or ng-eNodeB (LTE base stations supporting a 5G Core Network) of an NG-RAN.

Core network 1330 is the central part of communication system 1300 that provides various services to customers who are connected by RAN 1320. One example of core network 1330 is the Evolved Packet Core (EPC) network as suggested by the 3GPP for LTE. Another example of core network 1330 is a 5G core network as suggested by the 3GPP. Core network 1330 includes network elements 1332, which may comprise servers, devices, apparatus, or equipment (including hardware) that provide services for UEs 1310. Network elements 1332, in an EPC network, may comprise a Mobility Management Entity (MME), a Serving Gateway (S-GW), a Packet Data Network Gateway (P-GW), etc. Network elements 1332, in a 5G network, may comprise an Access and Mobility Management Function (AMF), a Session Management Function (SMF), a Policy Control Function (PCF), an Application Function (AF), a User Plane Function (UPF), etc.

Communication system 1300 further includes a network management system (NMS) 1340. Network management system 1340 is a system that monitors, maintains, and manages RAN 1320 and/or core network 1330, and provides functionality for a network operator to view and manage the operation of RAN 1320 and/or core network 1330. Network management system 1340 collects performance indicators or metrics (i.e., Key Performance Indicators (KPI)) from RAN 1320 and/or core network 1330, and stores this data as a tabular dataset 1342.

In this embodiment, network management system 1340 may transmit tabular dataset 1342 to data mining system 100. Data mining system 100 may process tabular dataset 1342 as described above to extract a set of insights 220 from the tabular dataset 1342. Data mining system 100 may then perform one or more operations, actions, or functions based on the set of insights 220. For example, data mining system 100 may transmit the set of insights 220 to network management system 1340 so that network management system 1340 may perform a corrective action or preventative action. Data mining system 100 may automatically transmit control signals to network management system 1340 instructing network management system 1340 to perform a corrective action or preventative action. Users of communication system 1300 may therefore be more satisfied with the provided services when network management system 1340 is able to perform corrective/preventative actions based on the set of insights 220 harvested by data mining system 100.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

As used in this application, the term "circuitry" may refer to one or more or all of the following:

(a) hardware-only circuit implementations (such as implementations in only analog and/or digital circuitry);

(b) combinations of hardware circuits and software, such as (as applicable):
  (i) a combination of analog and/or digital hardware circuit(s) with software/firmware; and
  (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although specific embodiments were described herein, the scope of the disclosure is not limited to those specific embodiments. The scope of the disclosure is defined by the following claims and any equivalents thereof.

What is claimed is:

1. A data mining system comprising:
   at least one processor and memory;
   the at least one processor causes the data mining system to:
     receive a tabular dataset comprised of rows representing transactions, and columns representing attributes collected for the transactions;
     extract raw association rules from the tabular dataset, wherein each of the raw association rules comprises a relationship between a set of antecedents and a single consequent, and corresponds to one or more of the transactions;
     determine potential rule merge groups of the raw association rules based on the antecedents of the raw association rules;
     determine, for a potential rule merge group of the potential rule merge groups, one or more actual rule merge groups of the raw association rules in the potential rule merge group based on the transactions corresponding to the raw association rules in the potential rule merge group;
     combine, for an actual rule merge group of the actual rule merge groups, the raw association rules in the actual rule merge group to generate a merged association rule;
     generate a set of insights based on one or more merged association rules; and
     perform an operation based on the set of insights.

2. The data mining system of claim 1 wherein the at least one processor causes the data mining system to:
   display the set of insights to a user through a user interface component.

3. The data mining system of claim 1 wherein the at least one processor causes the data mining system to:
   train a machine-learning model of a machine-learning system with the set of insights.

4. The data mining system of claim 1 wherein the at least one processor causes the data mining system to:
   automatically transmit a control signal to a management system instructing the management system to perform a corrective action or preventative action based on the set of insights.

5. The data mining system of claim 1 wherein the at least one processor causes the data mining system to:
   receive user input from a user designating a set of the columns in the tabular dataset as the antecedents, and a set of the columns in the tabular dataset as the consequents.

6. The data mining system of claim 1 wherein the at least one processor causes the data mining system to:
   calculate a first distance matrix between the raw association rules based on the antecedents of the raw association rules; and
   perform hierarchical clustering to identify the potential rule merge groups based on the first distance matrix.

7. The data mining system of claim 6 wherein the at least one processor causes the data mining system to:
   determine whether the potential rule merge group is a singleton;
   calculate, when the potential rule merge group is not a singleton, a second distance matrix between the raw association rules in the potential rule merge group based on the transactions of the raw association rules in the potential rule merge group; and
   perform hierarchical clustering to identify the actual rule merge groups based on the second distance matrix.

8. The data mining system of claim 1 wherein the at least one processor causes the data mining system to:
   form the antecedents of the merged association rule by taking the union of the antecedents of the raw association rules in the actual rule merge group;
   form the consequents of the merged association rule by taking the union of the consequents of the raw association rules in the actual rule merge group; and
   calculate the transactions corresponding to the merged association rule by taking the intersection of the transactions of the raw association rules in the actual rule merge group.

9. The data mining system of claim 1 wherein:
   the set of insights comprises a set of initial insights that includes the merged association rules; and
   the at least one processor causes the data mining system to:
     determine potential insight merge groups of the initial insights based on the consequents of the initial insights;
     determine, for a potential insight merge group of the potential insight merge groups, one or more actual insight merge groups of the initial insights in the potential insight merge group based on the transactions corresponding to the initial insights in the potential insight merge group;
     combine, for an actual insight merge group of the actual insight merge groups, the initial insights in the actual insight merge group to generate a merged insight; and generate a set of final insights based on one or more merged insights; and the at least one processor causes the data mining system to perform the operation based on the set of final insights.

10. The data mining system of claim 9 wherein the at least one processor causes the data mining system to:
calculate a first distance matrix between the initial insights based on the consequents of the initial insights; and
perform hierarchical clustering to identify the potential insight merge groups based on the first distance matrix.

11. The data mining system of claim 10 wherein the at least one processor causes the data mining system to:
determine whether the potential insight merge group is a singleton;
calculate, when the potential insight merge group is not a singleton, a second distance matrix between the initial insights in the potential insight merge group based on the transactions of the initial insights in the potential insight merge group; and
perform hierarchical clustering to identify the actual insight merge groups based on the second distance matrix.

12. A method of processing a tabular dataset, the method comprising:
receiving the tabular dataset comprised of rows representing transactions, and columns representing attributes collected for the transactions;
extracting raw association rules from the tabular dataset, wherein each of the raw association rules comprises a relationship between a set of antecedents and a single consequent, and corresponds to one or more of the transactions;
determining potential rule merge groups of the raw association rules based on the antecedents of the raw association rules;
determining, for a potential rule merge group of the potential rule merge groups, one or more actual rule merge groups of the raw association rules in the potential rule merge group based on the transactions corresponding to the raw association rules in the potential rule merge group;
combining, for an actual rule merge group of the actual rule merge groups, the raw association rules in the actual rule merge group to generate a merged association rule;
generating a set of insights that includes one or more merged association rules; and
performing an operation based on the set of insights.

13. The method of claim 12 wherein extracting the raw association rules from the tabular dataset comprises:
receiving user input from a user designating a set of the columns in the tabular dataset as the antecedents, and a set of the columns in the tabular dataset as the consequents.

14. The method of claim 12 wherein determining the potential rule merge groups comprises:
calculating a first distance matrix between the raw association rules based on the antecedents of the raw association rules; and
performing hierarchical clustering to identify the potential rule merge groups based on the first distance matrix.

15. The method of claim 14 wherein determining, for the potential rule merge group of the potential rule merge groups, one or more actual rule merge groups comprises:

determining whether the potential rule merge group is a singleton;
calculating, when the potential rule merge group is not a singleton, a second distance matrix between the raw association rules in the potential rule merge group based on the transactions of the raw association rules in the potential rule merge group; and
performing hierarchical clustering to identify the actual rule merge groups based on the second distance matrix.

16. The method of claim 12 wherein combining the raw association rules in the actual rule merge group to generate a merged association rule comprises:
forming the antecedents of the merged association rule by taking the union of the antecedents of the raw association rules in the actual rule merge group;
forming the consequents of the merged association rule by taking the union of the consequents of the raw association rules in the actual rule merge group; and
calculating the transactions corresponding to the merged association rule by taking the intersection of the transactions of the raw association rules in the actual rule merge group.

17. The method of claim 12 wherein:
the set of insights comprises a set of initial insights that includes the merged association rules; and
the method further comprises:
determining potential insight merge groups of the initial insights based on the consequents of the initial insights;
determining, for a potential insight merge group of the potential insight merge groups, one or more actual insight merge groups of the initial insights in the potential insight merge group based on the transactions corresponding to the initial insights in the potential insight merge group;
combining, for an actual insight merge group of the actual insight merge groups, the initial insights in the actual insight merge group to generate a merged insight; and
generating a set of final insights based on one or more merged insights; and
performing the operation based on the set of insights comprises performing the operation based on the set of final insights.

18. The method of claim 17 wherein determining the potential insight merge groups comprises:
calculating a first distance matrix between the initial insights based on the consequents of the initial insights; and
performing hierarchical clustering to identify the potential insight merge groups based on the first distance matrix.

19. The method of claim 18 wherein determining, for the potential insight merge group of the potential insight merge groups, one or more actual insight merge groups comprises:
determining whether the potential insight merge group is a singleton;
calculating, when the potential insight merge group is not a singleton, a second distance matrix between the initial insights in the potential insight merge group based on the transactions of the initial insights in the potential insight merge group; and
performing hierarchical clustering to identify the actual insight merge groups based on the second distance matrix.

20. A non-transitory computer readable medium embodying programmed instructions executed by a processor, wherein the instructions direct the processor to implement a method of processing a tabular dataset, the method comprising:

receiving the tabular dataset comprised of rows representing transactions, and columns representing attributes collected for the transactions;

extracting raw association rules from the tabular dataset, wherein each of the raw association rules comprises a relationship between a set of antecedents and a single consequent, and corresponds to one or more of the transactions;

determining potential rule merge groups of the raw association rules based on the antecedents of the raw association rules;

determining, for a potential rule merge group of the potential rule merge groups, one or more actual rule merge groups of the raw association rules in the potential rule merge group based on the transactions corresponding to the raw association rules in the potential rule merge group;

combining, for an actual rule merge group of the actual rule merge groups, the raw association rules in the actual rule merge group to generate a merged association rule;

generating a set of insights that includes one or more merged association rules; and performing an operation based on the set of insights.

* * * * *